United States Patent
Uekita et al.

[11] Patent Number: 5,080,938
[45] Date of Patent: Jan. 14, 1992

[54] LIQUID CRYSTAL DISPLAY ELEMENT

[75] Inventors: Masakazu Uekita; Makoto Murata, both Hyogo, Japan

[73] Assignee: Kanegafuchi Kagaku Kogyo Kabushiki Kaisha, Osaka, Japan

[21] Appl. No.: 554,752

[22] Filed: Jul. 20, 1990

[30] Foreign Application Priority Data

Jul. 21, 1989 [JP] Japan .................. 1-189137
Sep. 27, 1989 [JP] Japan .................. 1-251543
Sep. 27, 1989 [JP] Japan .................. 1-251544
Sep. 27, 1989 [JP] Japan .................. 1-251545

[51] Int. Cl.$^5$ .......................... C09K 3/34
[52] U.S. Cl. ......................... 428/1; 428/913; 359/75
[58] Field of Search .............. 428/1, 913; 350/341

[56] References Cited

U.S. PATENT DOCUMENTS 4,590,103 5/1986 Ahne et al. ............ 427/387
4,911,958 3/1990 Mochizuki et al. ........ 350/341

OTHER PUBLICATIONS

EP-A-0 059 790 Dated: Sep. 15, 1982.
Patent Abstracts of Japan, vol. 8, No. 275 (P-321) Dated: Dec. 15, 1984.
Patent Abstracts of Japan, vol. 11, No. 357 (C-458) Dated: Nov. 20, 1987.

Primary Examiner—Alexander S. Thomas
Attorney, Agent, or Firm—Armstrong, Nikaido, Marmelstein, Kubovcik & Murray

[57] ABSTRACT

An element of liquid crystal display including an orientation film. The orientation film is obtained by building up at least one monomolecular film on a substrate having thereon at least an electrode layer. The monomolecular film is formed by spreading an amphiphilic high-molecular weight substance having a number average molecular weight of from 2,000 to 300,000 having a repeating unit represented by formula (I):

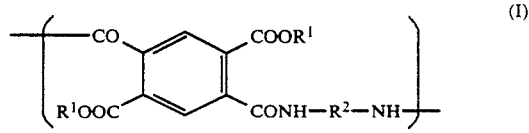

wherein $R^1$ represents an aliphatic group having from 12 to 30 carbon atoms; and $R^2$ represents at least one group selected from the group consisting of

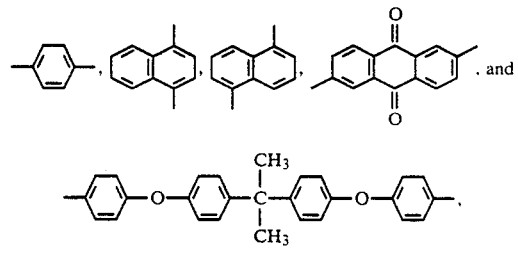

on a water surface, and subjecting the built-up film to a heat treatment to cause cyclization.

3 Claims, 1 Drawing Sheet

LIQUID CRYSTAL DISPLAY ELEMENT

FIELD OF THE INVENTION

This invention relates to an element of a liquid crystal display cell which has a novel liquid crystal orientation film.

BACKGROUND OF THE INVENTION

Flat displays using liquid crystals have been widely employed in watches, TV, etc. Liquid crystals in display elements in these devices are orientated by means of an orientation film. Conventional processes for forming an orientation film include oblique vapor deposition of $SiO_2$, Au, etc. on a substrate and a process comprising coating a polyimide type high-molecular weight resin on a substrate and rubbing the coat with cloth, etc. to provide orientation.

Although the technique of oblique vapor deposition is very advantageous in making liquid crystals with a prescribed pretilt angle, the technique must be carried out in a high degree of vacuum of about $10^{-5}$ Torr. Further, the deposition step is very complicated, making it difficult to obtain a wide display area and to attain satisfactory productivity.

The rubbing process also encounters difficulty in assuring uniformity of a wide display area and besides, dust or static electricity generated is liable to have adverse influences on display characteristics.

There is, therefore, a demand to develop a technique for orientating liquid crystals which will eliminate the above-described disadvantages of conventional processes.

SUMMARY OF THE INVENTION

An object of this invention is to provide a liquid crystal orientation film which is uniform and free from defects and exhibits satisfactory orientation properties and which can be produced without rubbing.

Another object of this invention is to provide a liquid crystal display element having high display quality.

It has now been found that the above objects of this invention are accomplished by an element of a liquid crystal display containing an orientation film which is obtained by building up at least one monomolecular film on a substrate having thereon at least an electrode layer, said monomolecular film being formed by spreading an amphiphilic high-molecular weight substance having a number average molecular weight of from 2,000 to 300,000 and having a repeating unit represented by formula (I):

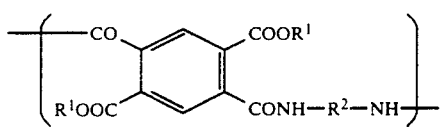

wherein $R^1$ represents an aliphatic group having from 12 to 30 carbon atoms; and $R^2$ represents at least one group selected from the group consisting of

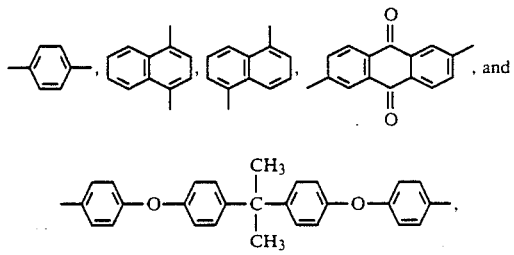

on a water surface, and subjecting the built-up film to a heat treatment to cause cyclization.

DETAILED DESCRIPTION OF THE INVENTION

Figure 1:
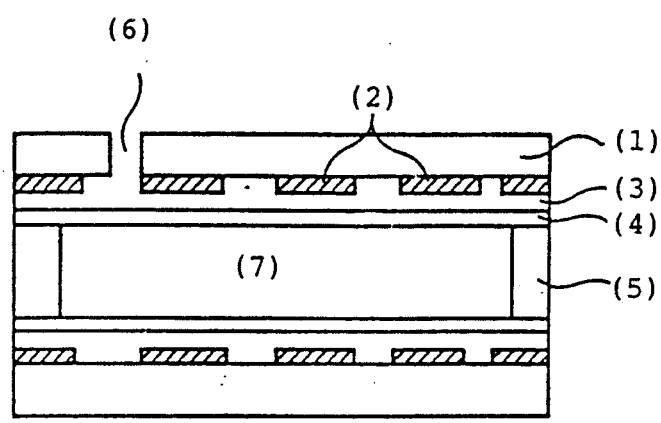
FIG. 1 illustrates a schematic cross-section of the liquid crystal display element according to the present invention.

The structure of the liquid crystal display device according to the present invention is described by referring to FIG. 1. Substrate (1) has formed thereon a transparent electrode pattern (2) and an insulating film (3). A liquid crystal orientation film (4) is formed on isulating film (3) by a Langmuir-Blodgett method. A pair of substrates having such a structure are assembled into a cell having a predetermined gap therebetween created by means of spacers (5). A liquid crystal material is injected into the gap from opening (6) to form liquid crystal layer (7) to provide a liquid crystal display device.

Although insulating film (3) is not an essential structure to the invention, it is preferable to form a coating of a silicon oxide, etc. on a transparent electrode, e.g., indium tin oxide (ITO).

The amphiphilic high-molecular weight substance which can be used for forming the monomolecular film has a number average molecular weight of from 2,000 to 300,000 and comprises a repeating unit represented by formula (I) shown above. The two aliphatic groups represented by $R^1$ provide the compound with hydrophobic properties, and the aliphatic groups are at para-positions, relative to one another in the form of a carboxylic acid ester.

The amphiphilic high-molecular weight substance of the present invention can be obtained by, for example, a condensation reaction between an acid halide of a pyromellitic diester having $R^1$ at para-positions and a diamine.

As the inventors previously proposed in JP-A-62-129317 (the term "JP-A" as used herein means an "unexamined published Japanese patent application"), the diesters of pyromellitic acid include two isomers illustrated below:

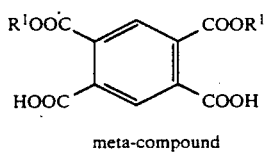

meta-compound

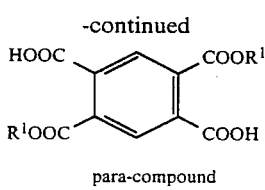

para-compound

Therefore, amphiphilic high-molecular weight substances can be synthesized using the isomeric mixture of a pyromellitic diester as a starting compound to produce copolymers containing these two isomers. As a result of further investigations, in an attempt to improve orientation properties of liquid crystals, the inventors found that polymers synthesized from a pyromellitic diester exhibit an improved ability to control orientation of a liquid crystal when the carboxylic acid ester groups $R^1$, which provide the polymer with hydrophobic properties, are at para-positions relative to one another.

In formula (I), specific examples of $R^1$ include $CH_3(CH_2)_{n-1}$, $(CH_3)_2CH(CH_2)_{n-3}$, and $(CH_3)_3C(CH_2)_{n-4}$, wherein n is from 12 to 30 and preferably from 16 to 22. Preferred $R^1$ groups are straight chain alkyl groups represented by $CH_3(CH_2)_{n-1}$ from the standpoint of both performance to impart hydrophobic properties and cost.

It has also been found that orientation properties can be markedly improved by condensing a diamine component, e.g., at least one compound selected from the group consisting of

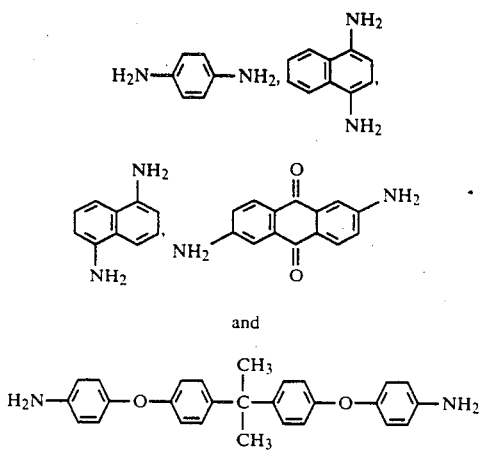

and with an acid halide of 3a pyromellitic diester

While the reason for the improvement has not yet been elucidated, it is believed that the molecular linearity or stiffness of these diamines have some relation.

The pyromellitic diester which can be used as an acid component in the present invention may contain up to about 10 to 20% by weight of a pyromellitic diester having $R^1$ at metapositions. Also, the diamine component which can be used in the present invention may contain up to about 10 to 20% by weight other than the above-described diamine compounds, such as m-phenylenediamine, 3,3'-diaminobiphenyl, 4,4'-diaminobiphenyl, 3,3'-methylenedianiline, 4,4'-hydroxydianiline, 3,3'-hydroxydianiline, 4,4'-carbonyldianiline, 3,3'-carbonyldianiline, 4,4'-sulfonedianiline, and 3,3'-sulfonedianiline.

Methods for forming a monomolecular film are not particularly limited. Those in which streaming orientation takes place at the time of building up are preferred. A vertical immersion method is one of the preferred embodiments.

The amphiphilic high-molecular substance to be spread on water may be mixed with known materials for forming a Langmuir-Blodgett membrane, such as long-chain fatty acids and long-chain alcohols, or high-molecular weight LB membrane materials as proposed in JP-A-63-218728.

Before monomolecular membranes are built up on a substrate, it is preferable that the substrate be subjected to a surface treatment, such as a silane coupling agent coating or a chelating agent coating.

The thus formed built-up film is then subjected to a heat treatment. Heat treatment is preferably carried out in an inert gas stream at a temperature at which a cyclization reaction is induced, usually ranging from 100° C. to about 400° C., and preferably from 150° C. to 250° C. Heat treatment with up to 300° C. is also able to carried out in air. The higher the temperature, the higher the rate of cyclization. By the heat treatment, satisfactory orientation properties can be obtained and, in addition, low-molecular weight substances which may have been incorporated during film formation can be removed to thereby improve chemical resistance and heat resistance of the resulting liquid crystal orientation film.

Thus, a uniform and defect-free liquid crystal orientation film having satisfactory orientation properties can be obtained without requiring a rubbing treatment. A liquid crystal display device using the resulting orientation film for controlling orientation of liquid crystals exhibits excellent display characteristics. The orientation film of the present invention can be applied to not only TN (twisted nematic) liquid crystals but also STN (supertwisted nematic) liquid crystals and ferroelectric liquid crystals.

The present invention is now illustrated in greater detail with reference to Examples, but it should be understood that the present invention is not construed as being limited thereto.

EXAMPLE 1

An electrode of ITO was vacuum deposited on one side of a glass substrate through a pattern mask to a thickness of 200 nm to form an electrode layer. Silicon oxide was then vacuum deposited onto the ITO electrode layer to a thickness of 100 nm to form an insulating layer.

Separately, an isomeric mixture of distearyl pyromellitate obtained by reacting a 1:2 (by mole) mixture of pyromellitic anhydride and stearyl alcohol was extracted with methylene chloride by using a Soxhlet's extractor to obtain a para-distearyl pyromellitate as a white solid and a metadistearyl pyromellitate as dissolved in the solvent. Each of the isomers was purified by recrystallization from ethanol.

A 1:1 (by mole) mixture of an acid chloride of the para-distearyl pyromellitate and p-phenylenediamine were reacted to obtain am amphiphilic high-molecular weight substance (A) having a number average molecular weight of 50,000. A monomolecular membrane was formed using a solution of the resulting polymer (A) dissolved in a mixed solvent of dimethylacetamide and chloroform, and spreading the solution on water and 11 monomolecular membranes were built up on the above-prepared glass substrate having thereon an ITO electrode layer by a vertical immersion method. The glass substrate having the built-up film (hereinafter referred to as LB film) was then heated at 200° C. for 1 hour in a nitrogen stream whereby cyclization of the polymer (A) proceeded, though not completely (about 50%), to produce polyimide having a repeating unit of formula shown below which exhibited very satisfactory chemical resistance and heat resistance:

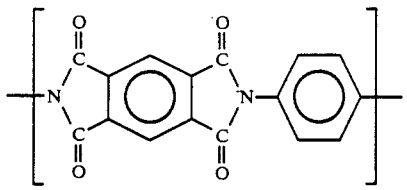

A pair of the thus treated glass substrates were prepared. A sealant resin comprising a commercially available acid anhydride curable epoxy resin having dispersed therein plastic beads having a particle diameter of 8 μm was print-coated on the 1 mm wide periphery of one of the glass substrates on the ITO electrode side thereof, with 5 mm long central portion of one of the sides (latera) of the glass substrate remaining non-coated to provide an opening. This substrate and the other prepared substrate were assembled to form a cell in such a manner that the pick-up directions of the two glass substrates during building up of LB film were at right angles with each other so that the transparent ITO electrode layers faced each other. The cell was heated at 140° C. for 3 hours under pressure to cure the sealant resin for adhesion. After the adhesion, a commercially available nematic liquid crystal ("ZLI 1565" produced by Merck Co.) was infused into the gap between the two substrates through the opening where the sealant resin had not been applied. The opening was then sealed with the sealant resin to complete a TN mode liquid crystal cell.

The resulting liquid crystal cell was heated once to 100° C. and then gradually cooled to conduct initial orientation to obtain a liquid crystal cell showing uniform and defect-free orientation of the liquid crystal.

EXAMPLE 2

A TN mode liquid crystal cell was produced in the same manner as in Example 1, except for using an amphiphilic high-molecular weight substance (B) having a number average molecular weight of about 30,000 synthesized by using an isomeric mixture (para-compound-:meta-compound=85:15) of distearyl pyromellitate. The ratio of para-compound to meta-compound in the polymer (B) was found to be 88:12 as calculated from signals of the proton NMR spectrum assigned to two protons on the benzene ring.

The resulting cell exhibited satisfactory orientation properties as in Example 1.

COMPARATIVE EXAMPLE 1

A TN mode liquid crystal cell was produced in the same manner as in Example 1, except for using an amphiphilic high-molecular weight substance (C) having a number average molecular weight of about 15,000 synthesized by using an isomeric mixture (para-compound-:meta-compound=50:50) of distearyl pyromellitate. The ratio of para-compound to meta-compound in the polymer (B) was found to be 60:40 as calculated from signals of the proton NMR spectrum assigned to two protons on the benzene ring.

The orientation of the liquid crystal suffered a disturbance and was inferior to that obtained in Example 1.

COMPARATIVE EXAMPLE 2

A TN mode liquid crystal cell was produced in the same manner as in Example 1, except that the LB film of the polymer (A) was not subjected to a heat treatment. The resulting cell suffered an orientation disturbance and was inferior to that of Example 1.

EXAMPLES 3 AND 4

A TN mode liquid crystal cell was produced in the same manner as in Example 1, except for the use of an orientation film obtained by forming a mixed LB film comprising a 1:1 (by mole) mixture of the polymer (A) and stearyl alcohol or a 1:1 (by mole) mixture of the polymer (A) and polyamide obtained by reacting N,N'-distearyl-p-phenylenediamine and isophthalic acid chloride, the polyamide being represented by formula:

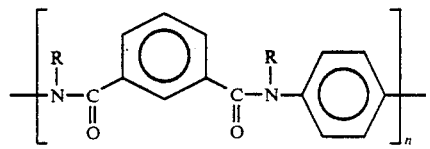

R: CH$_3$(CH$_2$)$_{17}$ and subjecting the mixed LB film to a heat treatment at 200° C. for 1 hour. Satisfactory orientation properties similar to those in Example 1 were obtained in each case.

EXAMPLES 5 AND 6

A TN mode liquid crystal cell was produced in the same manner as in Example 1, except for changing the heat treatment condition to 180° C. or 220° C. in air. Satisfactory orientation properties similar to those in Example 1 were obtained in each case.

EXAMPLE 7

A TN mode liquid crystal cell was produced in the same manner as in Example 1, except for using an amphiphilic high-molecular weight substance having a number average molecular weight of about 30,000 synthesized by using 2,6-diaminoanthraquinone in place of p-phenylenediamine. Satisfactory orientation properties similar to those in Example 1 were obtained.

EXAMPLE 8

A TN mode liquid crystal cell was produced in the same manner as in Example 1, except for using an amphiphilic high-molecular weight substance having a number average molecular weight of about 30,000 synthesized by using 1,4-naphthalenediamine in place of p-phenylenediamine. Similarly to Example 1, the cell was uniform and free from defects, showing satisfactory orientation properties.

EXAMPLE 9

A TN mode liquid crystal cell was produced in the same manner as in Example 1, except for using an amphiphilic high-molecular weight substance having a number average molecular weight of about 30,000 synthesized by using 1,5-naphthalenediamine in place of p-phenylenediamine. Similarly to Example 1, the cell was uniform and free from defects, showing satisfactory orientation properties.

EXAMPLE 10

A TN mode liquid crystal cell was produced in the same manner as in Example 1, except for using an amphiphilic high-molecular weight substance having a number average molecular weight of about 15,000 synthesized by using 2,2'-bis(4-aminophenoxyphenyl)propane in place of p-phenylenediamine. Similarly to Example 1, the cell was uniform and free from defects, showing satisfactory orientation properties.

COMPARATIVE EXAMPLE 3

A TN mode liquid crystal cell was produced in the same manner as in Example 1, except for using an amphiphilic high-molecular weight substance having a number average molecular weight of about 15,000 synthesized by using 4,4'-hydroxydianiline in place of p-phenylenediamine. As compared with the cell of Example 1, the resulting cell had an orientation disturbance and was inferior in orientation properties.

As described above, a liquid crystal orientation film having satisfactory performance in controlling orientation of liquid crystal molecules can be obtained without involving a rubbing treatment, i.e., by building up at least one monomolecular membrane formed by spreading a material containing at least the amphiphilic high-molecular weight substance according to the present invention on a water surface on a substance having at least an electrode and then subjecting the built-up film to a heat treatment which induces cyclization. Liquid crystal display devices using the orientation film of the present invention exhibit excellent display characteristics.

While the invention has been described in detail and with reference to specific embodiments thereof, it will be apparent to one skilled in the art that various changes and modifications can be made therein without departing from the spirit and scope thereof.

What is claimed is:

1. An element of a liquid crystal display comprising an orientation film which is obtained by building up at least one monomolecular film on a substrate having thereon at least an electrode layer, said monomolecular film being formed by spreading an amphiphilic high-molecular weight substance having a number average molecular weight of from 2,000 to 300,000 and having a repeating unit represented by formula (I):

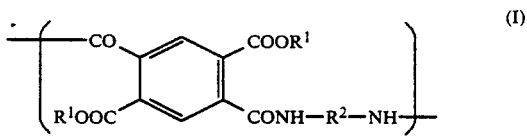

wherein $R^1$ represents an aliphatic group having from 12 to 30 carbon atoms; and $R^2$ represents at least one group selected from the group consisting of

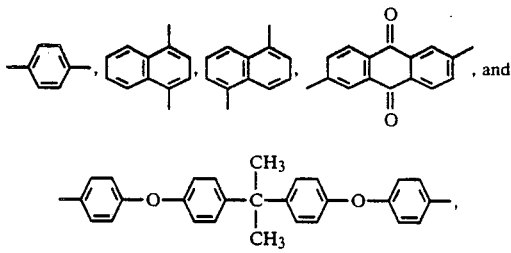

on a water surface, and subjecting the built-up film to a heat treatment to cause cyclization.

2. A liquid crystal display element as claimed in claim 1, wherein $R^1$ is an aliphatic group having from 16 to 22 carbon atoms.

3. A liquid crystal display element as claimed in claim 1, wherein $R^1$ is $CH_3(CH_2)_{n-1}$, wherein n is from 12 to 30.

* * * * *